July 17, 1928.
G. P. JACKSON ET AL
MEANS FOR HANDLING AND FEEDING PULVERIZED FUEL
Filed June 8, 1923
1,677,779
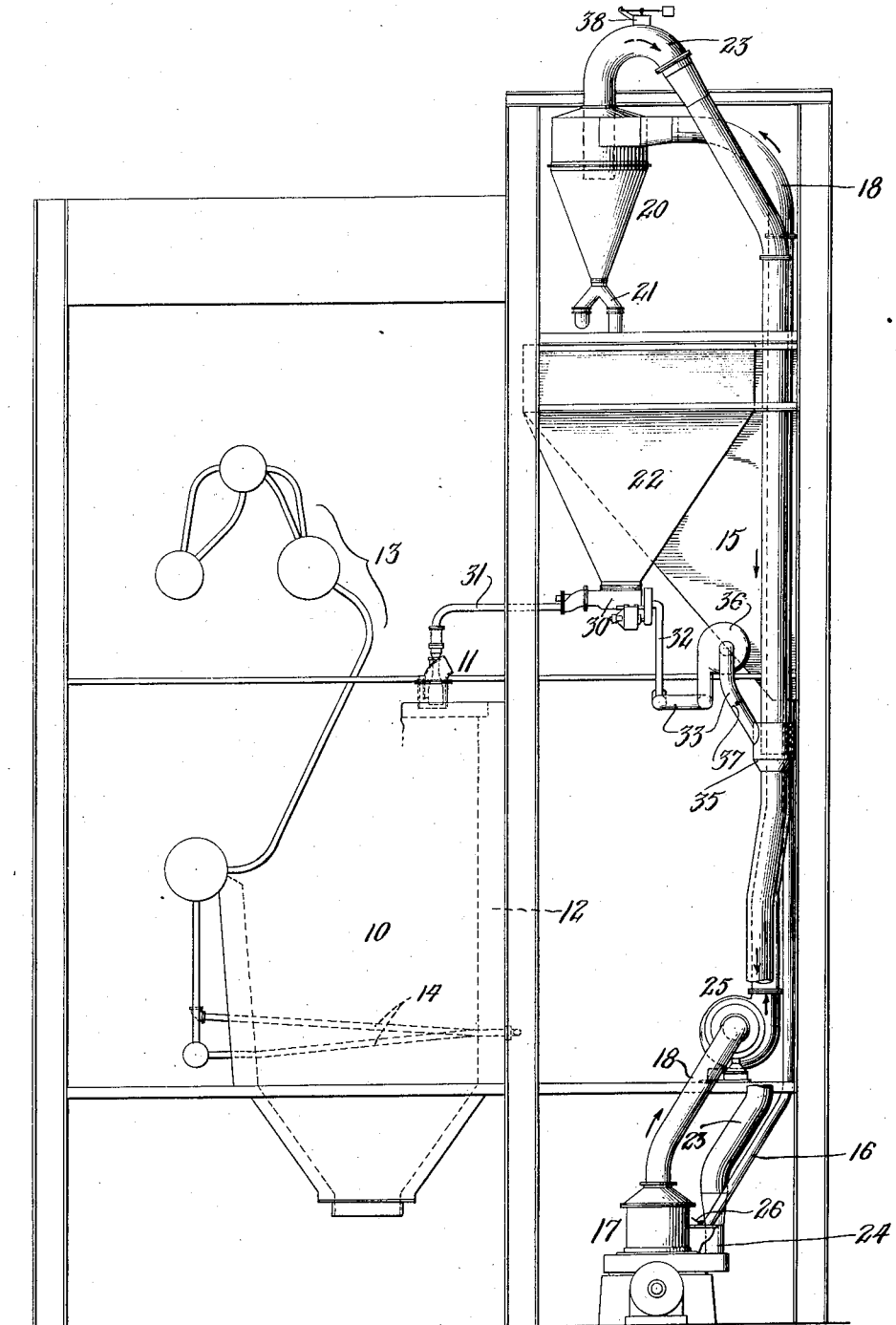

Patented July 17, 1928.

1,677,779

UNITED STATES PATENT OFFICE.

GEORGE P. JACKSON, OF FLUSHING, AND ARTHUR V. ADAMSON, OF HEMPSTEAD, NEW YORK, ASSIGNORS TO COMBUSTION ENGINEERING CORPORATION, A CORPORATION OF NEW YORK.

MEANS FOR HANDLING AND FEEDING PULVERIZED FUEL.

Application filed June 8, 1923. Serial No. 644,119.

Our invention relates to preparing, handling and feeding pulverized fuel, our aim being to improve the economy and efficiency of operation, and to eliminate waste. How these and other objects and advantages can be realized through the invention will appear from the explanation and description hereinafter of its application to one form of fuel supply system.

The drawing shows a somewhat diagrammatic and fragmentary side view of a steam boiler furnace with a pulverized fuel supply system embodying our invention, a portion of one of the conduits of the fuel supply system being broken out to expose parts behind it.

In the furnace here very diagrammatically illustrated, fuel with somewhat more than carrying air is admitted to the combustion chamber 10 through a downward directed burner 11 adjacent the front wall 12. The burning air and fuel stream descends in the chamber 10 until its momentum is overcome by the draft, when its bends upward and ascends in the rear of the chamber. The size and depth of the chamber 10 afford space for substantially complete combustion therein, and the products of combustion finally make their exit from the upper rear region of the chamber, to the heating surfaces of the water tube boiler 13. Just below the regions of combustion in the chamber 10, the falling particles of molten refuse from the fuel pass through a cooling zone maintained by a water screen 14 extending across the chamber and are thus cooled below fusion or slagging temperature so that they do not coalesce at the bottom of the chamber in a fused mass. As shown, this water screen 14 is composed of suitably spaced and inclined water tubes serially connected, in pairs, to the boiler 13. Additional air for combustion is supplied, preferably by induction, at the burner and at any suitable inlets (not shown) in the furnace walls.

In the type of fuel supply system here shown, there is a bin 15 for receiving and storing crushed fuel such as bituminous coal. From this bin 15, a chute 16 runs down to the intake of an aerating fuel pulverizer 17 of any preferred type. From the pulverizer 17, the fuel laden air passes up through a conduit 18 to a funnel shaped "Cyclone" separator 20, which it enters tangentially near the top. The powdered fuel falls to the bottom of the separator 20, and is discharged at 21 into one or more storage bins 22,—whence it is drawn as required to supply one or more of the burners 11. The air makes its exit through a conduit 23 (that extends down into the separator 20 as shown) and is returned to the air intake 24 of the pulverizer 17, to be again charged with fuel, etc., as just described. This continual substantially closed circulation of the carrying air may be maintained by a centrifugal exhauster fan 25 interposed at a suitable point in the conduit 18, to draw the unloaded air from the separator 20 and through the pulverizer 17, etc.

In the operation of such a fuel supply system a certain amount of outside air is continually entering,—either by leakage on the low pressure side of the exhauster 25, or by intentional admission at a "make up" air intake 26 with which the pulverizer 17 is provided. If the fuel operated on is damp, such continual influx of fresh air serves a useful purpose in maintaining the capacity of the air in the system for absorbing the moisture, which might otherwise accumulate and become troublesome.

In any case, however, a corresponding amount of air must continually be discharged and gotten rid of.

In systems of this character hitherto proposed, this excess air has generally been discharged from the return side of the system, and especially from its "high point" just above the separator 20. Inasmuch, however, as the returning air thus discharged contains a percentage of fuel (not eliminated and recovered in the separator 20) which should not be simply discharged into the atmosphere, on account of sanitary regulations as well as of considerations of economy, special measures are demanded for the recovery of such fuel.

Our invention has primarily to do with these conditions, and instead of simply discharging excess air from the return side of the system, we suply such air to the furnace, where its fuel content will be directly useful. We do this through the apparatus employed to serve the burner 11 with fuel,— here shown as an electric motor driven aerating feeder 30 of the type commonly used in pulverized fuel burning systems.

As here shown, the feeder 30 receives powdered fuel from the superjacent bin 22 by gravity, and delivers it to the burner 11 through a pipe or conduit 31, as usual. Instead, however, of merely drawing in outside air to carry the fuel to the burner 11, as usual, the feeder 30 takes part or all of the carrying air required from the return conduit 23 of the main fuel supply system, through conduits 32, 33 connected to a drum or expansion chamber 35 in free communication with said conduit 23. As here shown, the conical lower end of the drum 35 is directly connected to the upper end of a lower section of the return conduit 23, and the upper section of said conduit 23 extends down through the top of said drum close to the bottom, while the conduit 33 leading to the feeder 30 is connected into the annular space in the upper end of the drum, around the pipe 23.

By allowing the air drawn off from the conduit 23 to come, comparatively speaking, to a state of relative rest, this arrangement minimizes the amount of fuel drawn off with such air. As here shown, means such as a blower or exhauster 36 may be interposed in the conduit 33, to draw off the air from the supply conduit 33 and force it into the feeder 30 and assure its adequacy at all times. Since air under pressure is required to force the fuel from the feeder 30 through the pipe 31 to the furnace, our invention results in a saving of power, the blower 36 not only serving the purpose of exhausting the air from the return line 23, but at the same time supplying all or a part of the necessary air blast for the feeder. A regulating butterfly damper 37 is preferably placed in the conduit 33, as a means of regulating the suction effect of the feeder blower 36 on the air in the separation system, and preventing it from disturbing the balance in the system. Also, a vent 38 may be placed in the return air line 23, to afford a discharge for surplus air in case the feeder blower 36 should be stopped from any cause while the rest of the system continued to operate. As shown, this vent 38 is of an automatic safety valve type, so as to open of itself as soon as the pressure in the conduit 23 becomes somewhat higher than usual.

We claim:

1. A pulverized fuel system including a furnace, a pulverizer, means including a pipe for causing a current of air to carry off the pulverized fuel from the pulverizer, a separator into which said pipe discharges, a pipe leading from the separator to the pulverizer for returning the air, from which the fuel has been separated, back to the pulverizer, a reservoir to which the separator delivers the separated fuel, a feeder from said reservoir, burner means for the furnace supplied from said feeder, and means for supplying return air to said feeder.

2. The combination with a furnace, of a return-air pulverizing and conveying system, a feeder for the furnace, means for supplying the feeder with pulverized fuel from the system, and a combined means for exhausting air from the return side of the system and for supplying air under pressure to the feeder.

3. The combination with a furnace, of a return-air pulverizing and conveying system with closed circulation of carrying air, a feeder for the furnace, means for supplying the feeder with pulverized fuel from the system, and means for drawing off and supplying air from the return side of the system to the feeder.

4. The combination with a furnace, of a return-air pulverizing and conveying system with closed circulation of carrying air, a feeder for the furnace, means for supplying the feeder with pulverized fuel from the system, an expansion chamber communicating with the return conduit of said system, and an air supply conduit for the feeder connected to the upper region of said chamber.

In testimony whereof, we have hereunto signed our names.

GEORGE P. JACKSON.
ARTHUR V. ADAMSON.